May 9, 1961 H. H. HYMAN ET AL 2,983,658
HETEROGENEOUS NUCLEAR REACTOR EMPLOYING SMALL UNCLAD
BODIES OF FISSIONABLE MATERIAL AS FUEL
Filed Nov. 30, 1956 4 Sheets-Sheet 1

INVENTORS
Herbert H. Hyman
Joseph J. Katz
BY
Roland A. Anderson
Attorney

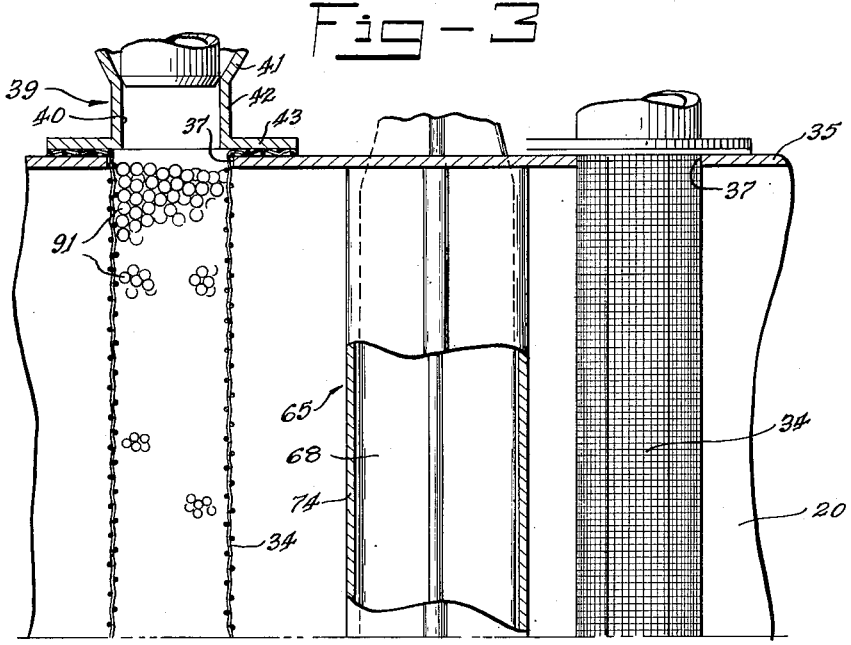
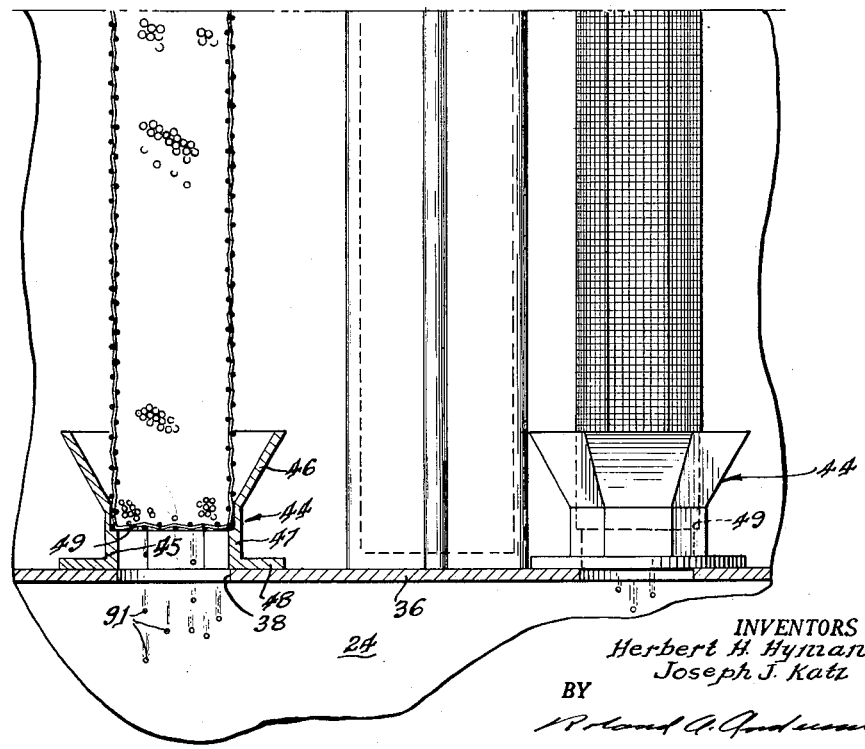

INVENTORS
Herbert H. Hyman
Joseph J. Katz
BY
Roland A. Anderson
Attorney

United States Patent Office 2,983,658
Patented May 9, 1961

2,983,658

HETEROGENEOUS NUCLEAR REACTOR EMPLOYING SMALL UNCLAD BODIES OF FISSIONABLE MATERIAL AS FUEL

Herbert H. Hyman and Joseph J. Katz, Chicago, Ill., assignors to the United States of America as represented by the United States Atomic Energy Commission Filed Nov. 30, 1956, Ser. No. 625,569

8 Claims. (Cl. 204—154.2)

This invention relates to a nuclear reactor and to a method of operating a nuclear reactor. More particularly, the invention relates to the structure and operation of a heterogeneous nuclear reactor employing as fuel small, unclad bodies of a fissionable material.

Heterogeneous reactors are reactors which employ as fuel thermal neutron fissionable material in the form of bodies, usually lumped as a metal or compound in some regular pattern within a moderator material. Homogeneous reactors have also been built and are those reactors in which the thermal neutron fissionable material and moderator are intimately mixed.

Both types of reactors have certain advantages and disadvantages. One of the primary disadvantages of conventional heterogeneous reactors as constructed prior to the time of this invention is that the fuel elements are clad in a corrosion-resistant covering to prevent corrosion of the fuel element by the coolant fluid and to prevent fission products from escaping from the fuel element into the coolant fluid. The amount of effort that has gone into development of suitable cladding materials and into development of techniques for cladding the fuel elements and then stripping the cladding from the fuel element after use in a reactor is a familiar story to all those skilled in the art.

On the other hand a homogeneous reactor normally employs as fuel a fissionable material dissolved or dispersed in a liquid such as ordinary or heavy water. Elimination of the requirement for cladding of fuel elements eliminates many of the problems attendant upon the operation of heterogeneous reactors. Homogeneous reactors, in addition, have the advantage that they lend themselves to continuous processing of the reactive composition since it is a simple matter to remove a portion of the reactive compositon from the reactor system for processing to recover the remaining fissionable material and the reaction products. Unfortunately great difficulties have been experienced in the operation of homogeneous reactors because of corrosion of the materials of construction of the reactor by the solution or slurry containing the fissionable material.

In order to obtain an adequate concentration of fissionable isotope in a homogeneous reactor employing natural uranium as fuel, the concentration of uranium in solution must be so high as to make operation of the reactor impractical because of excessive corrosion of the materials of construction. In order to reduce the concentration of uranium in solution, uranium enriched in $U^{235}$ must be employed, and the uranium must be enriched to a much greater extent than it would be for a comparable heterogeneous reactor. The use of enriched fuel, of course, tends to lead to higher fuel and inventory costs.

It is accordingly an object of the present invention to construct a nuclear reactor combining many of the advantages of homogeneous and heterogeneous reactors.

It is also an object of the present invention to construct a heterogeneous nuclear reactor which requires no cladding on the fuel elements.

It is a specific object of the present invention to construct a heterogeneous heavy-water- moderated and cooled, natural-uranium, research reactor which is adapted to continuous removal and processing of spent fuel materials.

Another object of the present invention is to develop a method or operating a heterogeneous nuclear reactor wherein the surfaces of the fuel elements are continuously removed and processed to obtain reaction products.

It is a further object of the present invention to develop a method of operating a heterogeneous, natural-uranium nuclear reactor wherein the plutonium formed in the fuel elements is rapidly removed from the reaction zone.

Yet another object of the present invention is to develop a method of operating a heterogeneous nuclear reactor comprising continuously introducing solid fuel elements into the reactor, continuously introducing a liquid coolant into the reactor, and continuously removing a portion of the fuel from the reactor in solution in the moderator.

These and other objects of the invention are attained by construction and operation of a heterogeneous nuclear reactor in which the fuel elements comprise randomly packed fuel elements in direct contact with a coolant liquid solvent, wherein the fuel elements are permitted to dissolve in the coolant liquid, and wherein a portion of the coolant liquid is removed continuously for processing to recover reaction products.

While the specific fuel employed in the reactor to be described in detail is natural uranium, that is, uranium of the isotopic content found in nature, the invention is not restricted thereto. Other fuels containing a larger proportion of $U^{235}$ or a different fissionable material such as $Pu^{239}$ or $U^{233}$ may be employed. To obtain the greatest advantage from the invention the fuel should be a mixture of a fissionable material and a fertile material such as is natural uranium. By fissionable material is meant a material fissionable by neutrons of thermal energy and by fertile material is meant a material which by the capture of neutrons is converted into a material which is fissionable by neutrons of thermal energy. The critical masses of other fissionable materials may be determined for particular reactor active portion configurations according to methods which are now well known in the art.

The invention will now be described by reference to the accompanying drawings wherein Fig. 1 is a central vertical sectional view of a nuclear reactor constructed according to the teachings of the present invention;

Fig. 6 is a block diagram illustrating the reactor coolant and processing circuits employed in connection with the present invention.

Figure 1:
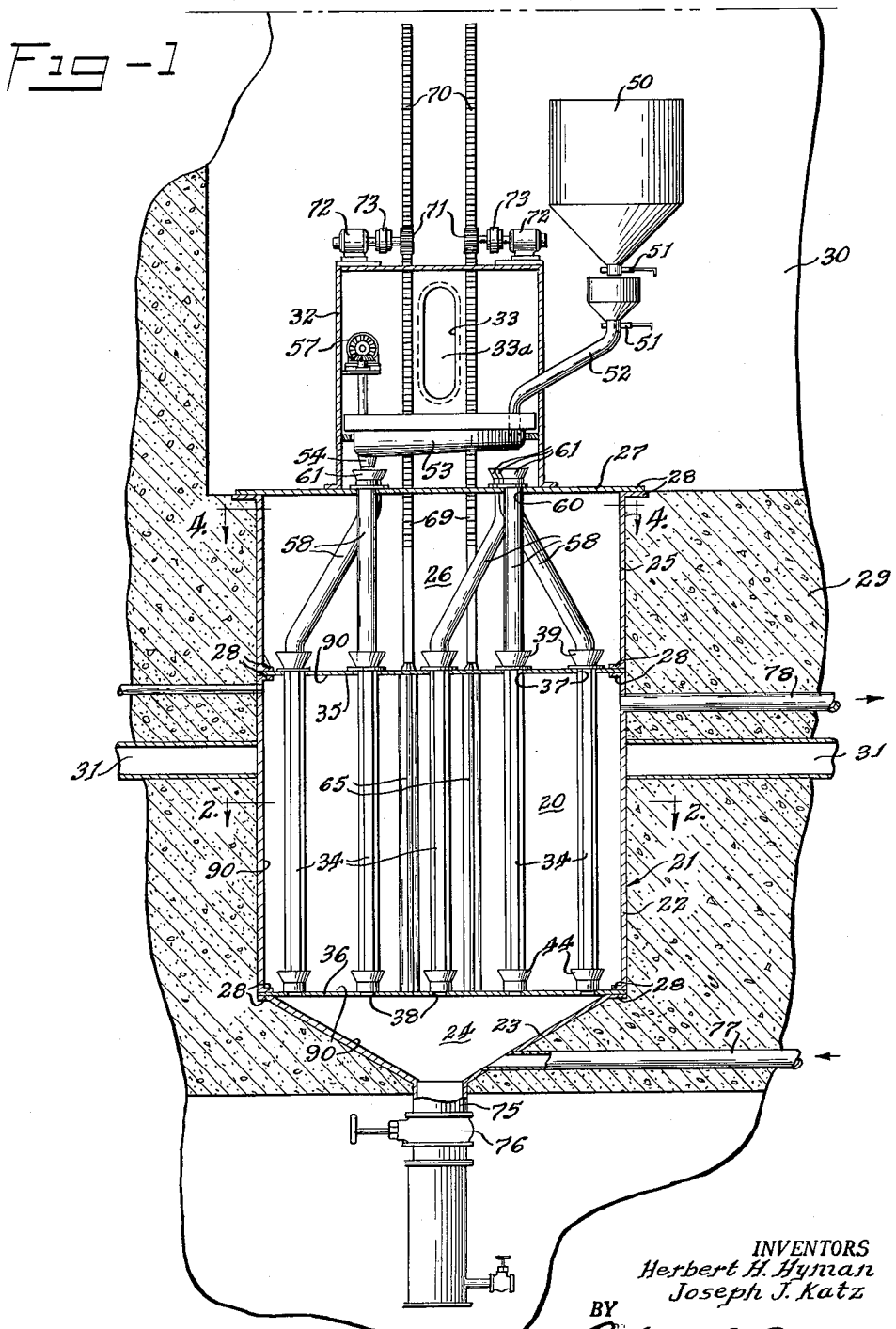

As shown in Fig. 1 of the drawing the reactor according to the present invention comprises a core or active portion 20 contained within a reactor vessel 21. Reactor vessel 21 is hexagonal in cross section and consists of three sections; a main section 22 in which is located the active portion 20 of the reactor, a lower section 23 enclosing a coolant inlet chamber 24, and an upper section 25 enclosing fuel element feed chamber 26. A top plate 27 covers the top of fuel element feed chamber 26. Top plate 27 is joined to upper section 25 of reactor vessel 21 and the three sections 22, 23, and 25 of the reactor vessel are joined at flanges 28 by bolts (not shown).

A massive biological shield 29 of concrete completely surrounds the reactor vessel 21. An access room 30 is located in the shield 29 above the reactor vessel 21 so that top plate 27 of the reactor vessel 21 forms a part of the floor of the access room 30. Biological shield 29 is penetrated by six shafts 31 which are used for experimental purposes. Since a high gamma and neutron flux exists about the reactor vessel 21, objects placed in these shafts 31 may be irradiated therein and observed to determine the effect of the radiation.

A cylindrical housing 32 extends upwardly into access room 30 from the top plate 27 of the reactor vessel 21. Housing 32 is smaller in diameter than is the reactor vessel 21 and is pierced by two inlet ports 33 over which closures 33a fit.

In one particular construction of the nuclear reactor which will be used to illustrate the present invention throughout the specification, the reactor vessel is 170 centimeters across from corner to corner and the main section 22 thereof is 160 centimeters deep. The upper section 25 thereof is 80 centimeters deep and the lower section 23 is 40 centimeters deep. The cylindrical housing 32 is 110 centimeters deep and 100 centimeters in diameter. The reactor vessel 21, top plate 27, and lower assembly plates 35 and 36 are constructed of A.I.S.U. types 304 or 304 E.L.C. stainless steel with a .15 centimeter corrosion layer of zirconium 90 thereon.

Figure 2:
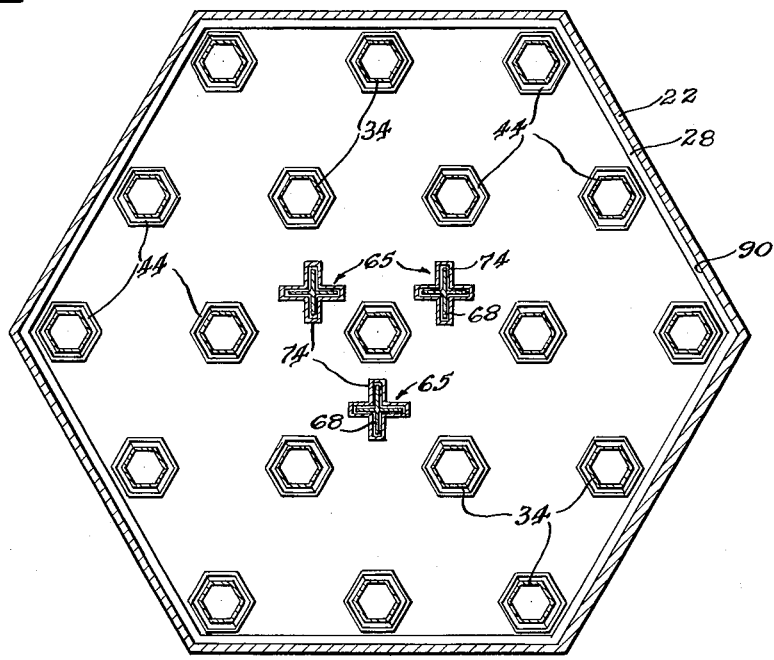
Fig. 2 is a partial sectional view taken along the line 2—2 in Fig. 1 and looking in the direction of the arrows.
Figure 3:
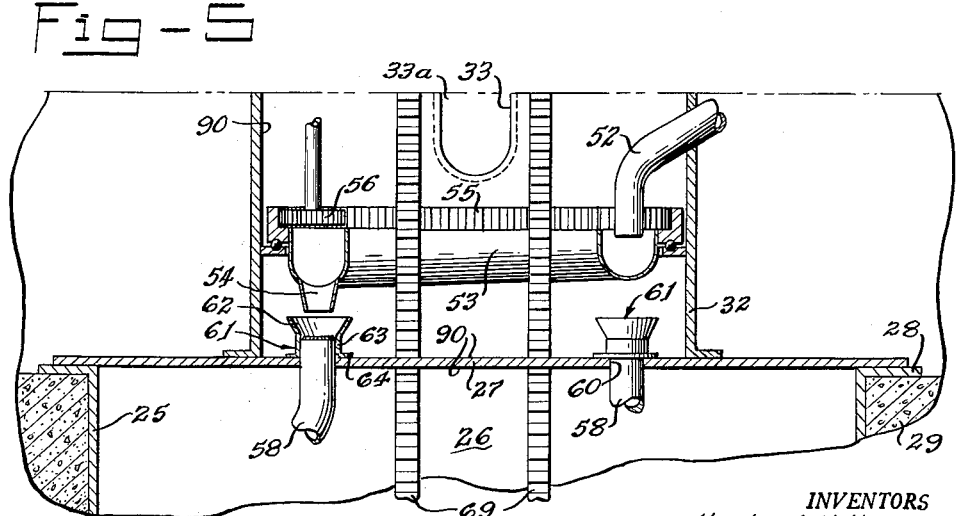
Fig. 3 is a partial vertical sectional view taken along the line 3—3 in Fig. 2 and looking in the direction of the arrows.
Figure 4:
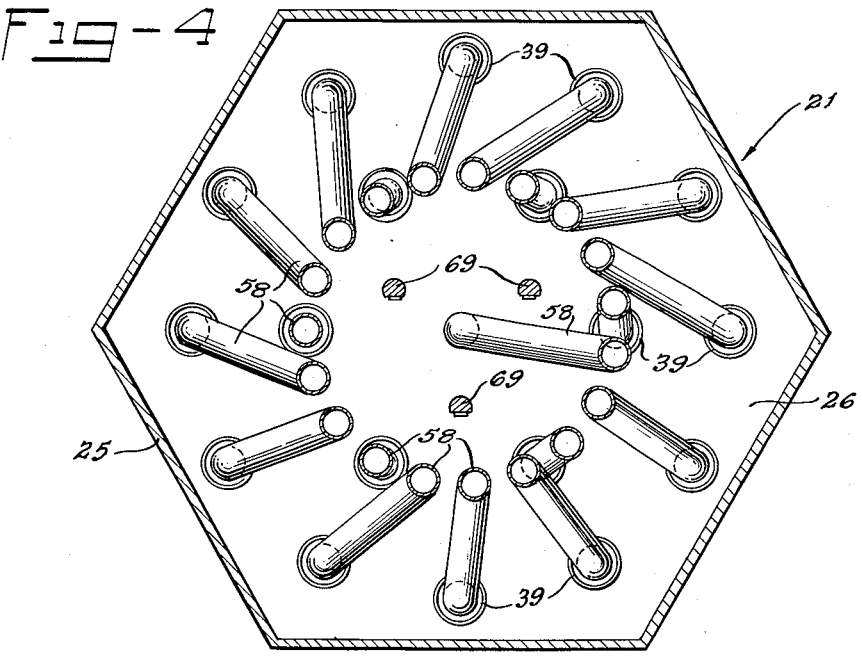
Fig. 4 is a partial sectional view taken along the line 4—4 in Fig. 1 and looking in the direction of the arrows.

The core 20 of the reactor contains nineteen elongated hexagonal baskets 34 shown clearly in Figs. 2 and 3 of the drawing. Each basket 34 is 9.17 centimeters from corner to corner (inside dimension) and 156.8 centimeters deep. The baskets 34 are constructed of zirconium wire which is .15 centimeter in diameter with .4 centimeter square openings in the sides of the baskets and .5 centimeter square openings in the bottom of the baskets. Baskets 34 may be removed from the reactor and replaced by lifting the housing 32 and equipment supported thereby away from the reactor vessel 21.

Baskets 34 are supported between upper and lower assembly plates 35 and 36 respectively. Upper and lower assembly plates 35 and 36 are located at the top and bottom of the main section 22 of the reactor vessel 21 and are supported by the walls of the reactor vessel 21. Each of the plates 35 and 36 has nineteen hexagonal openings 37 and 38 respectively therein. The openings in both upper and lower plates 35 and 36 are arranged to form regular hexagons about a central opening. Six openings are thus located in an inner row about the central opening and twelve openings are located in an outer row. The openings in the upper and lower plates 35 and 36 are aligned and the openings in each plate are disposed 36.7 centimeters apart from the center of one opening to the center of each adjacent opening. Lower openings 38 are slightly smaller in size than are upper openings 37.

An upper support 39, circular in cross section, having a circular opening 40 extending therethrough, is disposed about each of upper openings 37 and extends thereabove. The support 39 includes a funnel-shaped portion 41 and a stem 42. The support 39 is attached to plate 35 by means of flange 43 extending outwardly from the stem 42 of the support 39.

A lower support 44, hexagonal in cross section, having a hexagonal opening 45 extending therethrough, is disposed about each of lower openings 38 and extends thereabove. The support 44 includes a funnel-shaped portion 46 and a stem 47. Support 44 is attached to plate 36 by means of flange 48 extending outwardly from the stem 47 of support 44. The hexagonal opening 45 is smaller in the lower portion of the stem 47 than in the upper portion thereby forming a ledge 49.

The baskets 34 are held in place in hexagonal array within the reactor by the upper and lower supports 39 and 44. The lower end of the baskets rests on ledge 49 within stem 47 of the lower support 44. The upper end of the baskets 34 passes through openings 37 and is secured between flange 43 of support 39 and upper assembly plate 35.

The fissionable material is contained within the baskets 34. In the specific embodiment of the invention described this material is natural uranium in the form of pellets or spheres 91 one centimeter in diameter. The total amount of uranium required is 1625 kg. which will be divided equally among the 19 baskets 34. The means for feeding the fuel to the baskets 34 will now be described.

Figure 5:
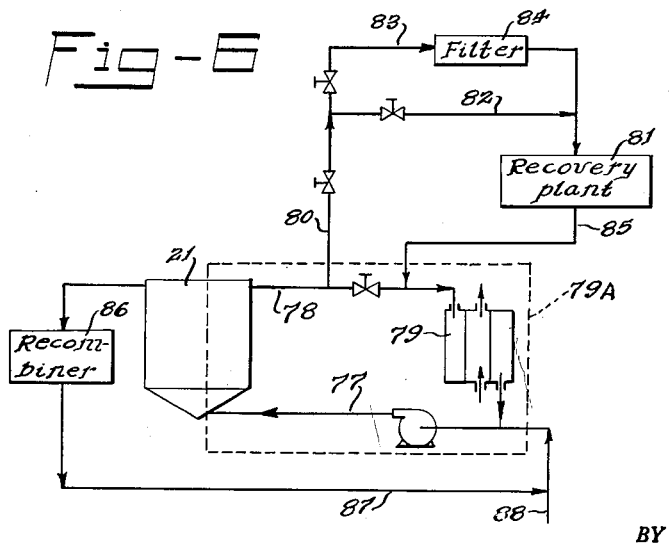
Fig. 5 is a partial sectional view illustrating in detail the fuel element feed means of the reactor.

The fuel pellets 91 are stored in a hopper 50 from which they are released through valve 51 into feed conduit 52. Feed conduit 52 leads into the interior of housing 32 in which is located an annular feed trough 53 which is shown in more detail in Fig. 5 of the drawing. The pellets traverse the feed conduit 52 and fall into annular feed trough 53. The bottom of the annular feed trough 53 is inclined to the horizontal and slants down to a lowest point at one side thereof. At this point there is a discharge funnel 54 leading downwardly from the bottom of the trough 53. Annular trough 53 is provided with an internal gear 55 about the circumference thereof. Rotation of annular trough 53 may be accomplished by rotation of pinion 56 by motor 57.

Located in fuel element feed chamber 26 are basket feed conduits 58. There is a separate conduit 58 for each basket 34. At their lower ends the conduits 58 rest in the funnel-shaped portion 41 of upper support 39. The upper ends of conduits 58 pass through openings 60 in top plate 27 to extend a short distance thereabove.

Top plate 27 has nineteen openings 60 therein arranged symmetrically about the center of the reactor vessel. The distance of the openings 60 from the center of the reactor vessel is the same as the distance of the discharge funnel 54 from the center of the vessel. A feed funnel 61 containing a funnel-shaped portion 62, a stem 63, and a flange 64, extending horizontally away from the stem 63, is disposed about each opening 60 in plate 27 and extends thereabove. Feed funnels 61 are attached to plate 27 by flanges 64. At their upper ends basket feed conduits 58 fit snugly into stems 63 of feed funnels 61.

It will be at once apparent that discharge funnel 54 may be positioned over each feed funnel 61 in turn by rotation of annular trough 53. Thus it is possible to feed fuel pellets into any of the baskets 34 from annular trough 53 through basket feed conduits 58. Pellets may be fed automatically and continuously in this manner to the baskets to maintain the mass of fuel therein to any desired level. It will be obvious that operation of valve 51 and motor 57 may be accomplished manually to maintain the desired quantity of fuel in each of baskets 34. In view of the high level to which the art of automatic instrumentation has attained in this art, the preferred manner of operation however will be automatic.

The construction and operation of the control means of the reactor will now be described. Three control elements 65 are provided for this reactor. Control elements 65 pass through apertures in plate 27 and upper assembly plate 35 and are supported and operated from above. The control elements 65 are located symmetrically about the center of the reactor. Each control element 65 is located at the center of the triangle formed by the center hexagonal basket 34 and two of the baskets 34 in the inner row of baskets. Each control element 65 comprises a section 68 containing a material having a high neutron capture cross section and an operating section 69 comprising rack 70 of a rack and pinion gear 7. Control elements 65 may be moved vertically by motors 72 by means of rack and pinion gear 71. A failsafe magnetic clutch 73 is provided for each control element 65 so that in an emergency the control element 65 will drop under the influence of gravity into a position within the core 20 of the reactor where it will shut down the reactor.

Section 68 of each control element 65 is shaped in the form of a cross for structural strength. Each section 68 is 150 centimeters long, 6 centimeters wide and .5 centimeter thick. In the specific reactor described the material of section 68 is an alloy containing 50% hafnium and 50% zirconium.

That portion of the control element 65 within the core 20 of the reactor is protected from the action of the coolant liquid by a cross-shaped sleeve 74 within which it operates. Sleeve 74 extends between upper and lower assembly plates 35 and 36 and may be formed of zirconium.

It is apparent that control of the reactor may readily be had by operation of motors 72 to move section 68 of the control elements 65 into or out of the core 20 of the reactor thereby changing the number of neutrons in the core which are available for fissioning of the fuel.

To start the reactor baskets 34 are filled with pellets 91 of uranium one centimeter in diameter until a total of 1625 kilograms is placed therein. Two control elements 65 are then pulled all the way out and the reactor vessel is filled with heavy water containing 5 grams of uranium per liter in solution and acidified with $D_2SO_4$ until the chain reaction starts. Then one of the elements 65 is inserted half way into the core 20 of the reactor and the same solution added until the chain reaction again starts. This is the operating level of the heavy water solution.

Coolant inlet chamber 24 comprises a collecting chamber for the undissolved portion of the fuel pellets as well as a coolant inlet chamber. The bottom of the chamber 24 funnels down into a discharge conduit 75 provided with a discharge valve 76. That portion of the fuel pellets which is not dissolved by the coolant liquid is removed from the reactor through valve 76. This may be accomplished continuously or intermittently as desired. The coolant is introduced into coolant inlet chamber 24 through coolant inlet pipe 77. The coolant leaves the reactor vessel 21 through coolant outlet pipe 78 which is located near the top of the main section 22 of the reactor vessel 21. It is apparent that the coolant will pass from the coolant inlet chamber 24 through the openings 38 in the lower assembly plate 36 into hexagonal baskets 34, through the mass of fuel pellets 91 contained therein, out through the sides of the baskets 34, and finally out of the reactor vessel 21 through outlet pipe 78.

The coolant leaving the reactor vessel is continuously passed through a heat exchanger 79 to dissipate the heat developed in the reactor. The coolant is then returned to the reactor vessel through inlet pipe 77 thus forming coolant circuit 79A.

The coolant solvent employed is heavy water ($D_2O$) made acid with .05 gram per liter deuterium sulfate ($D_2SO_4$). The acid prevents uranium dioxide, formed by the action of water on uranium metal, from precipitating out by putting the uranium into solution in the form of the sulfate.

The total flow rate of cooling water through the reactor is about 2400 liters per minute. The inlet coolant water temperature is about 25° C. At an operating power level of 2850 kilowatts, the outlet temperature of the water is 42° C. and the average thermal flux within the reactor core is $5.1 \times 10^{12}$ neutrons/cm.²/second.

All pipes with which the coolant solution comes into contact are constructed of titanium. The heavy water from which the coolant solution is formed of course serves both as a coolant and as a moderator.

Under the conditions present in the reactor the fuel pellets 91 will gradually dissolve in the acidified coolant. The pellets are introduced into the top of the baskets 34. As the pellets gradually dissolve in the heavy water solution, they get smaller and work their way down toward the bottom of the baskets. When the pellets are small enough to drop through the openings in the screen at the bottom of the basket, they will do so and may then be removed from coolant inlet chamber 24 through valves 76 for reprocessing. The pellets thus pass generally countercurrent to the heavy water coolant which thereby dissolves a portion of the fuel pellets.

One of the primary advantages of the system arises from the fact that uranium acts as a powerful shielding agent for resonance neutrons. The concentration of the plutonium formed from the $U^{238}$ content of the natural uranium by neutron capture is therefore higher in the outer layers of the fuel elements than in the interior of the fuel elements. Since the coolant dissolves the outer layer of the fuel element, it preferentially removes that portion of the fuel element which has the highest content of plutonium. By removing the plutonium promptly as soon as possible after it is formed, losses due to fissioning of the plutonium are minimized and the plutonium is removed as $Pu^{239}$ prior to the formation of substantial quantities of $Pu^{240}$. Likewise, there is obviously an advantage in removing the plutonium as rapidly as possible, since for a given reactor power and plutonium yield it is economical to process at the highest possible plutonium concentration.

It will be apparent that the reactor may be operated under conditions whereby the fuel pellets substantially completely dissolve in the coolant liquid. Such a procedure of course will have the advantage that separate processing steps for the dissolved uranium and that which is not dissolved are not required. If such a procedure is to be followed, the screen at the bottom of the hexagonal baskets 34 will of course be replaced by a porous plate which permits the heavy water to rise up through it but does not permit the uranium bodies to drop out of the baskets.

The amount of uranium and acid in solution is maintained constant. For example, operation of the reactor may be carried out with five grams per liter of uranium and .05 gram per liter of $D_2SO_4$ in solution. This amount of uranium in solution is many times less than that required for a natural-uranium homogeneous reactor so that this solution is much less corrosive than would be such a solution. When the reactor is started up, this amount of uranium sulfate will be added to the heavy water. As the reaction proceeds and uranium is dissolved by the acidified heavy water, uranium will be removed from the solution as fast as it is put into solution. Likewise, acid will be added to the solution as fast as it is removed therefrom.

The uranium is removed from the solution by taking off a side stream through line 80 from the coolant circuit 79A. The side stream may be passed directly to a uranium recovery plant 81 through line 82 or, in the alternative, may be passed by line 83 through filter 84 to the uranium recovery plant 81.

Which alternative is taken depends on how much plutonium is carried by the solution. One of the important advantages of the system is that plutonium is insoluble in the coolant solution under the conditions specified provided the plutonium is present in the solution in the amount of 1000 parts per million or more. Operation of the specific reactor as described does not produce sufficient plutonium to take advantage of this feature since the reactor is a small research reactor in which the production of plutonium, although important, is incidental. However, a large power reactor, operated in the megawatt range using a pressurized system constructed according to the teachings of this invention, could be operated so that the plutonium produced will be insoluble in the solution and can be filtered therefrom. This can be done in a high flux reactor by adjusting the rate of solution of the fuel element as described hereinbelow.

In uranium recovery plant 81 uranium and fission products are removed from the heavy water. If filter 84 has not been employed plutonium likewise is removed from the heavy water and the plutonium and uranium separated by procedures which are now standardized. The heavy water is returned to coolant circuit 79A though line 85.

Under the conditions specified for the described reactor, the rate at which the uranium pellets are corroded is about 10 milligrams/cm.²/hour. Therefore, about 6500 grams of uranium per hour will be dissolved in the system. To maintain the concentration of uranium constant in the coolant solution, 1300 liters of the solution will be removed from the coolant circuit 79A through line 80 per hour. The uranium and plutonium is removed from this portion of the coolant solution as described above and the heavy water returned to the reactor vessel.

A conventional recombiner 86 is provided to recombine disassociated deuterium and oxygen back into heavy water. The recombiner 86 faces an added load since the reaction of the uranium with the acidified solution forms deuterium whereas in conventional homogeneous reactors the deuterium is formed only as a result of radiative action on the heavy water. However, it is a simple matter to add additional oxygen to the recombiner to maintain the proper ratio of deuterium and oxygen for recombination. The recombined heavy water is returned to the coolant circuit 79A through line 87. Make-up heavy water acidified to a pH of 3 with $D_2SO_4$ may be added through line 88.

As described the reactor employs bare spheres of natural uranium as fuel. As already mentioned other fuel materails may be used. In addition the individual fuel elements can take various shapes such as small cylinders, pins, rings, wire helices, saddle stampings, chain links, of the like.

Other manners of packing the fuel elements are possible. The important requirements are that the fuel elements must corrode so as to leave the net surface area and total weight of uranium in the baskets 34 substantially constant during operation; the packing should be reasonably uniform with no excessively large voids to provide a minimum risk of channelling; and the packing should allow a minimum number of hot spots for sintering and guarantee turbulent flow with thorough contact between the coolant and the fuel elements.

Although the reactor described employs $D_2O$ as the coolant and $D_2SO_4$ as the acid, it is apparent that other coolants and other acids could be employed. For example, a reactor employing partially enriched uranium as fuel could employ $H_2O$ as the coolant and $H_2SO_4$ as the acid. Also it is possible to make the solution acid with other acids such HF, DF, HCl, or DCl.

The same principle involved in the described system can be applied to liquid metal coolants. For example, bismuth or alloys of such metals as aluminum or magnesium may be employed as the solvent coolant. Even in systems where uranium does not dissolve readily, such as a sodium cooled system, it is possible to add reagents to the liquid metal to react with and disintegrate the uranium fuel element and remove it as a slurry.

It will be apparent that in any system the corrosion rate of the uranium must be adjusted for maximum efficiency of the system. This can be done by modifying the coolant solution or by modifying the composition of the fuel elements. For example, a very slight change in the pH of the coolant solution will change the corrosion rate considerably. Also since alloys of uranium have been investigated which are either more or less corrosion resistant than is pure uranium, it is possible by alloying the uranium to obtain fuel elements which will corrode at practically any desired rate.

As an aid in understanding the present invention, reference is made to the following publications: Experimental Production of Divergent Chain Reaction, E. Fermi, American Journal of Physics, vol. 20, No. 9, December 1952; Science and Engineering of Nuclear Power, C. Goodman, Addison-Wesley Press, Inc., Cambridge, Mass., vol. 1 (1947) and vol. 2 (1949); The Elements of Nuclear Reactor Theory, S. Glasstone and M. Edlund, D. Van Nostrand Co., Inc., New York, 1952; Elementary Pile Theory, H. Soodak and E. C. Campbell, John Wiley and Sons, New York, 1950; and to U.S. Patent No. 2,708,656, issued on May 17, 1955, to E. Fermi and L. Szilard.

From the foregoing description, it will be readily apparent to the man skilled in the art that the reactor disclosed satisfies the objects of this invention.

It is not desired that the scope of the present invention be limited by the foregoing description but only by the appended claims.

What is claimed is:

1. A nuclear reactor system having a core comprising a reactor vessel containing a moderator liquid, a plurality of elongated baskets disposed vertically in said reactor vessel, pellets of a material fissionable by neutrons of thermal energy capable of being dissolved by said moderator liquid randomly packed in said elongated baskets in direct contact with said moderator liquid, means for feeding said pellets of a material fissionable by neutrons of thermal energy into the top of said baskets so as to maintain within the said vessel a quantity sufficient to maintain a chain reaction, means for continuously withdrawing a portion of the moderator from the reactor vessel, and means for continuously separating the spent fissionable material and reaction products from the said portion of the moderator.

2. A nuclear reactor system according to claim 1 wherein the material fissionable by neutrons of thermal energy is natural uranium and the moderator is heavy water.

3. A nuclear reactor system having a core comprising a reactor vessel containing heavy water, a plurality of elongated baskets disposed vertically in said reactor vessel, pellets of natural uranium randomly packed in said elongated baskets in direct contact with the heavy water, means for feeding said pellets of natural uranium into the top of the baskets so as to maintain within the said vessel a quantity sufficient to maintain a chain reaction, means for continuously withdrawing a portion of the heavy water from the reactor vessel, a filter for filtering off the insoluble plutonium contained therein, and means for continuously separating the spent uranium and fission products from the said portion of the moderator.

4. A nuclear reactor system having a core comprising a reactor vessel containing a coolant liquid, a plurality of elongated baskets disposed vertically in said reactor vessel, pellets of a material fissionable by neutrons of thermal energy capable of being slowly dissolved by the coolant liquid randomly packed in said elongated baskets in direct contact with said coolant liquid, means for continuously withdrawing a portion of the coolant from the reactor vessel, means for continuously separating the spent fissionable material and reaction products from the said portion of the coolant, and means feeding pellets of said material fissionable by neutrons of thermal energy into the reactor vessel at the rate at which the said material is removed from the system so as to maintain within said reactor vessel at all times sufficient fissionable materials to sustain a chain reaction.

5. A nuclear reactor system according to claim 4 wherein the material fissionable by neutrons of thermal energy is uranium and the coolant is bismuth.

6. A method of operating a heavy-water-cooled and moderated, natural-uranium nuclear reactor comprising establishing a reactive composition comprising a plurality of small pellets of natural uranium randomly packed, arranged within a mass of heavy water which has been acidified with deuterium sulfate whereby the uranium is gradually dissolved in the acidified heavy water, continuously withdrawing a portion of the heavy water from the reactor thereby continuously removing a part of the uranium from the reactive composition, and introducing pellets of natural uranium into the reactive composition at the rate at which uranium is being withdrawn in solution.

7. A method according to claim 6 wherein the withdrawn portion of heavy water is continuously processed to separate the uranium dissolved therein from products of the nuclear reaction.

8. A method according to claim 7 wherein the processing of the withdrawn stream of heavy water includes passing the stream through a filter to remove plutonium therefrom.

References Cited in the file of this patent

UNITED STATES PATENTS

| | | |
|---|---|---|
| 2,640,754 | Lundquist | June 2, 1953 |
| 2,778,792 | Szilard | Jan. 22, 1957 |
| 2,812,303 | Daniels | Nov. 5, 1957 |
| 2,825,688 | Vernon | Nov. 4, 1958 |
| 2,860,093 | Wigner et al. | Nov. 11, 1958 |

OTHER REFERENCES

Bruyn et al.: "International Conference on the Peaceful Uses of Atomic Energy," vol. 3, pages 121–124, August 1955, United Nations publication. (Copy in Div. 46).